United States Patent
Barber et al.

[11] Patent Number: 6,132,540
[45] Date of Patent: Oct. 17, 2000

[54] METHOD OF FABRICATING A DOOR AND A DOOR

[75] Inventors: Douglas Victor Barber; Victor Joseph Mazier, both of Hay River, Canada

[73] Assignee: Northern Delichte Ltd., Hay River, Canada

[21] Appl. No.: 09/206,785

[22] Filed: Dec. 7, 1998

[30] Foreign Application Priority Data

Nov. 23, 1998 [CA] Canada ..................................... 2254300

[51] Int. Cl.7 ................. B32B 31/06; E06B 3/70
[52] U.S. Cl. .......................... 156/78; 156/242; 156/245; 156/292; 156/293; 49/503; 52/784.1; 52/784.13; 52/786.15
[58] Field of Search ............................. 156/78, 242, 245, 156/292, 293; 49/503; 52/784.1, 784.13, 786.15, 309.9

[56] References Cited

U.S. PATENT DOCUMENTS

| | | |
|---|---|---|
| 4,218,848 | 8/1980 | Nelson . |
| 4,327,535 | 5/1982 | Governale ............................ 52/309.11 |
| 4,864,789 | 9/1989 | Thorn ..................................... 52/309.9 |
| 5,369,869 | 12/1994 | Bies et al. ................................ 29/460 |

*Primary Examiner*—Sam Chuan Yao
*Attorney, Agent, or Firm*—Christensen O'Connor Johnson Kindness PLLC

[57] ABSTRACT

A method of fabricating a door and a door. A first step involves molding a first door skin. A second step involves molding a second door skin. One or both of the first door skin and the second door skin have molded in place rails. One or both of the first door skin and the second door skin have molded in place stiles. A third step involves integrally bonding the first door skin and the second door skin. This produces a door having a body with integrally formed skins, rails, and stiles. A lock latch area and hinge pockets can also be integrally molded into the door.

5 Claims, 6 Drawing Sheets

METHOD OF FABRICATING A DOOR AND A DOOR

FIELD OF THE INVENTION

The present invention relates to a method of fabricating a door and a door fabricated in accordance with the teachings of the method.

BACKGROUND OF THE INVENTION

Solid wood doors are becoming increasingly rare. Most door manufacturers produce what has come to be know as a "door blank". A door blank has two door skins separated along top and bottom edges by wooded members known as "rails" and along side edges by wooden members known as "stiles". A wooden "lock block" is placed between the skins where a door latch is to be positioned. A cavity between the skins within boundaries defined by the rails and stiles is referred to as a "core" of the door and the material that fills the core is referred to as "coring". The above described components are subjected to a glue pressing process in order to produce a door blank. The most popular type of door blank for interior doors is a "hollow core" door. For exterior doors, insulating foam is injected into the core.

Door blanks manufactured, as described above, are sold to "Prehangers". Prehangers are secondary manufacturers who machine the door blank in preparation for receiving door hinges and latch hardware. The Prehangers bore holes to receive the door latch and machine recesses for placement of hinges. Some manufacturing processes have been developed that produce a door with characteristics that reduce the amount of machining that Prehangers must perform. An example of such a door is U.S. Pat. No. 4,218,848 by Nelson entitled "Plastic Foam-filled Door Having Integral Plastic Housing Defining Lock Cylinder and Lock Bolt Chambers". The Nelson reference discloses a door in which a borehole is premachined through the door skins. The boreholes in the two door skins are then aligned and a plastic lock housing insert is positioned in the borehole prior to the door being subjected to the glue pressing process and the injection of insulating foam coring.

Both interior and exterior doors manufactured through the glue pressing process, as described above, have experienced problems. Interior doors have a problem with delamination, where the door skin comes away from one of the rails or stiles as a results of glue failure. They are also prone to warp when subjected to climactic changes. Exterior doors are subject to moisture infiltration in the area of the lock latch. In cold climates this causes the lock latch to freeze and fail. In moist climates this results in warpage of wooden skins and rusting of metallic skins. Warpage can also occur in exterior doors due to temperature differentials, for example when it is 70 degrees fahrenheit indoors and minus 30 degrees fahrenheit outdoors.

SUMMARY OF THE INVENTION

What is required is an alternative method of fabricating a door that will not be as prone to warpage or moisture infiltration, and a door fabricated in accordance with the teachings of the method.

According to one aspect of the present invention there is provided a method of fabricating a door. A first step involves molding a first door skin. A second step involves molding a second door skin. One or both of the first door skin and the second door skin have molded in place rails. One or both of the first door skin and the second door skin have molded in place stiles. A third step involves integrally bonding the first door skin and the second door skin. This produces a body having integrally formed skins, rails, and stiles.

A door produced in accordance with the teachings of the above described method is hermetically sealed against moisture. It is formed by a molding and not a glue pressing process, and will, therefore, not "delaminate". The mode of fabrication, as described, will produce a door that will be less subject to warpage. In addition, there are a number of collateral benefits from using this method. At the completion of fabrication, the door is prefinished. It can be molded to any size, design and colour desired. Once molded in a selected colour, scratches will be less visible as the material is the same colour throughout. A scratch merely reveals material of the same colour.

Although beneficial results may be obtained through the use of the method, as described above, the dramatically different approach permits a number of innovations to be introduced. Even more beneficial results may be obtained when one or both of the first door skin and the second door skin has a molded in place latch area with a lock chamber and a lock bolt bore.

Although beneficial results may be obtained through the use of the method, as described above, even more beneficial results may be obtained when one or both of the first door skin and the second door skin have molded in place hinge pockets, such that upon integrally bonding the first door skin and the second door skin the door blank has integral hinge pockets. This eliminates the need for Prehangers.

Although beneficial results may be obtained through the use of the method, as described above, even more beneficial results may be obtained when the integral hinge pockets include integrally formed screw receiving apertures. This reduces the time and effort necessary to prepare the door for hanging as holes do not have to be drilled.

Although beneficial results may be obtained through the use of the method, as described above, even more beneficial results may be obtained when the first door skin and the second door skin have molded in place bevelled edges. This reduces the time and effort necessary to plane the doors edges to prepare the door for hanging as the edges come bevelled.

Although beneficial results may be obtained through the use of the method, as described above, even more beneficial results may be obtained when the body has a cavity into which is injected insulating foam. This both insulates and sound proofs the door.

According to another aspect of the present invention there is provided a door which includes a body of moldable material having integrally molded skins, rails, and stiles.

As described above in relation to the preferred method, the door can be further improved to reduce or eliminate the need for prehangers and reduce the need for preparation at the time of hanging by adding selected features. It is preferred that the body also have an integrally molded latch area including a lock chamber and a lock bolt bore. It is preferred that the body have integrally molded hinge pockets. It is preferred that the integrally molded hinge pockets have integrally molded screw receiving apertures. It is preferred that the body have integrally molded bevelled edges.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
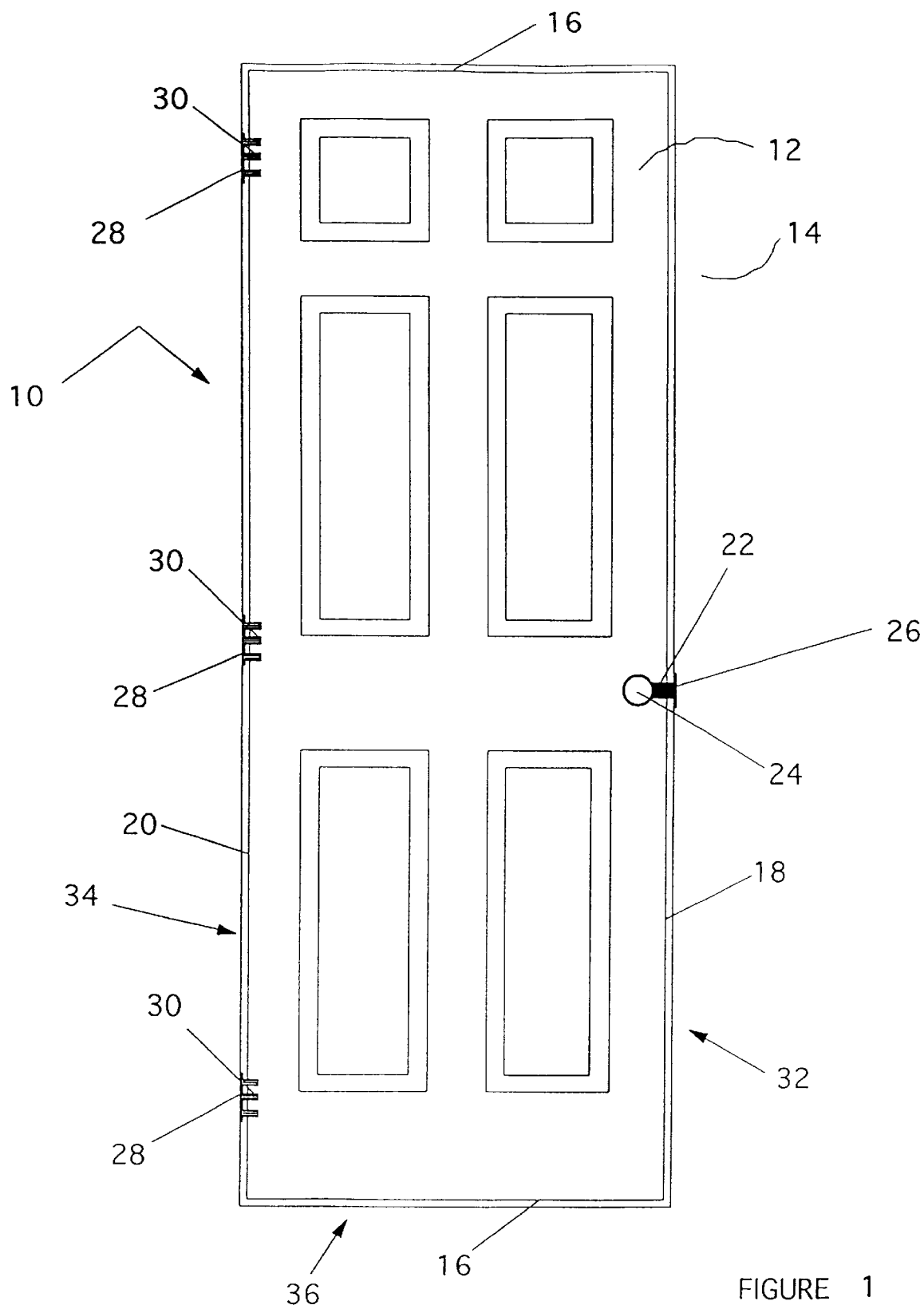
FIG. 1 is a front elevation view of a door fabricated in accordance with the teachings of the present invention.

The preferred method of fabricating a door, generally indicated by the reference numeral 10, will now be described with reference to FIGS. 1 through 6.

Figure 2:
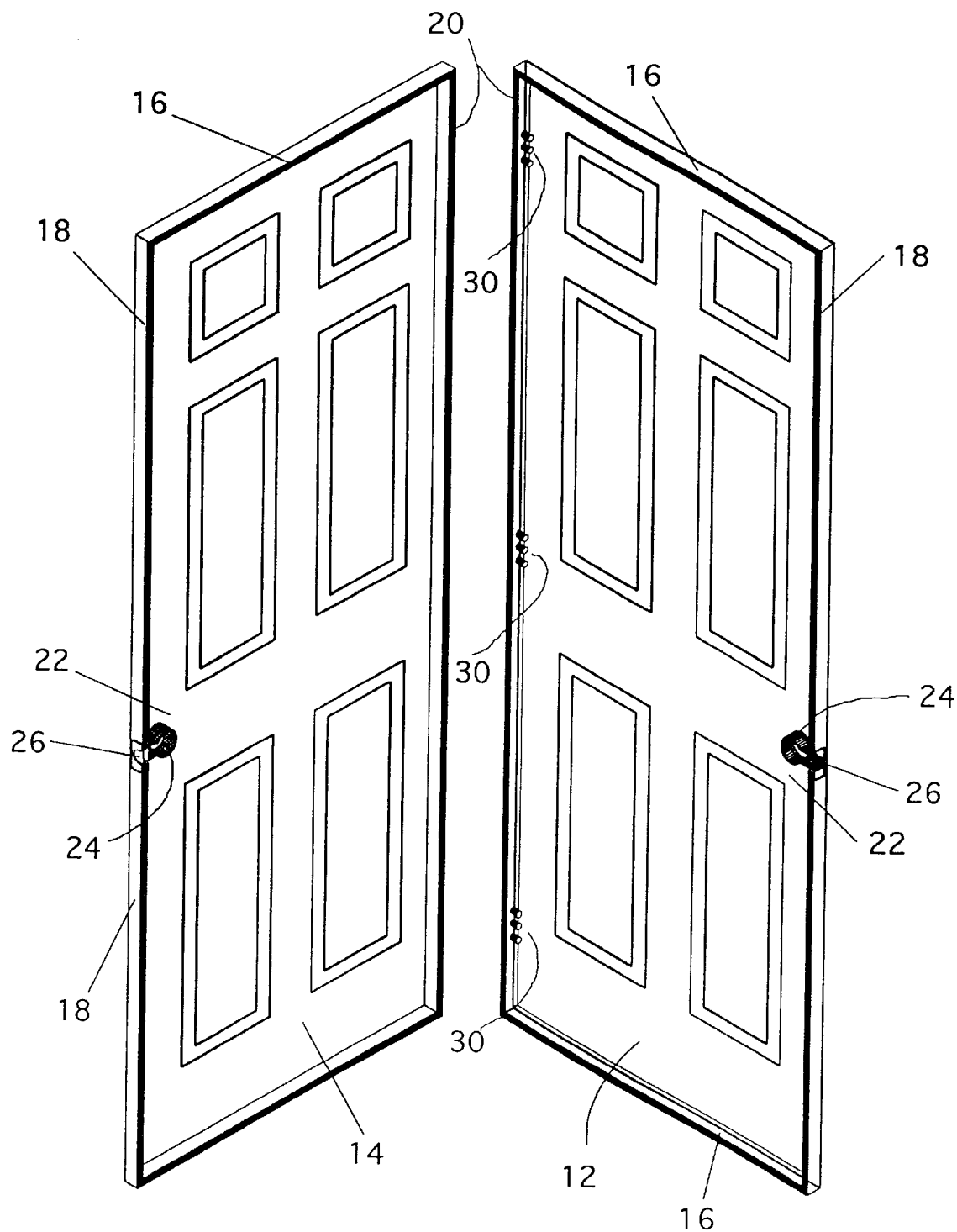
FIG. 2 is an exploded perspective view of a first molded door skin and a second molded door skin representing steps in the fabrication of the door illustrated in FIG. 1.
Figure 3:
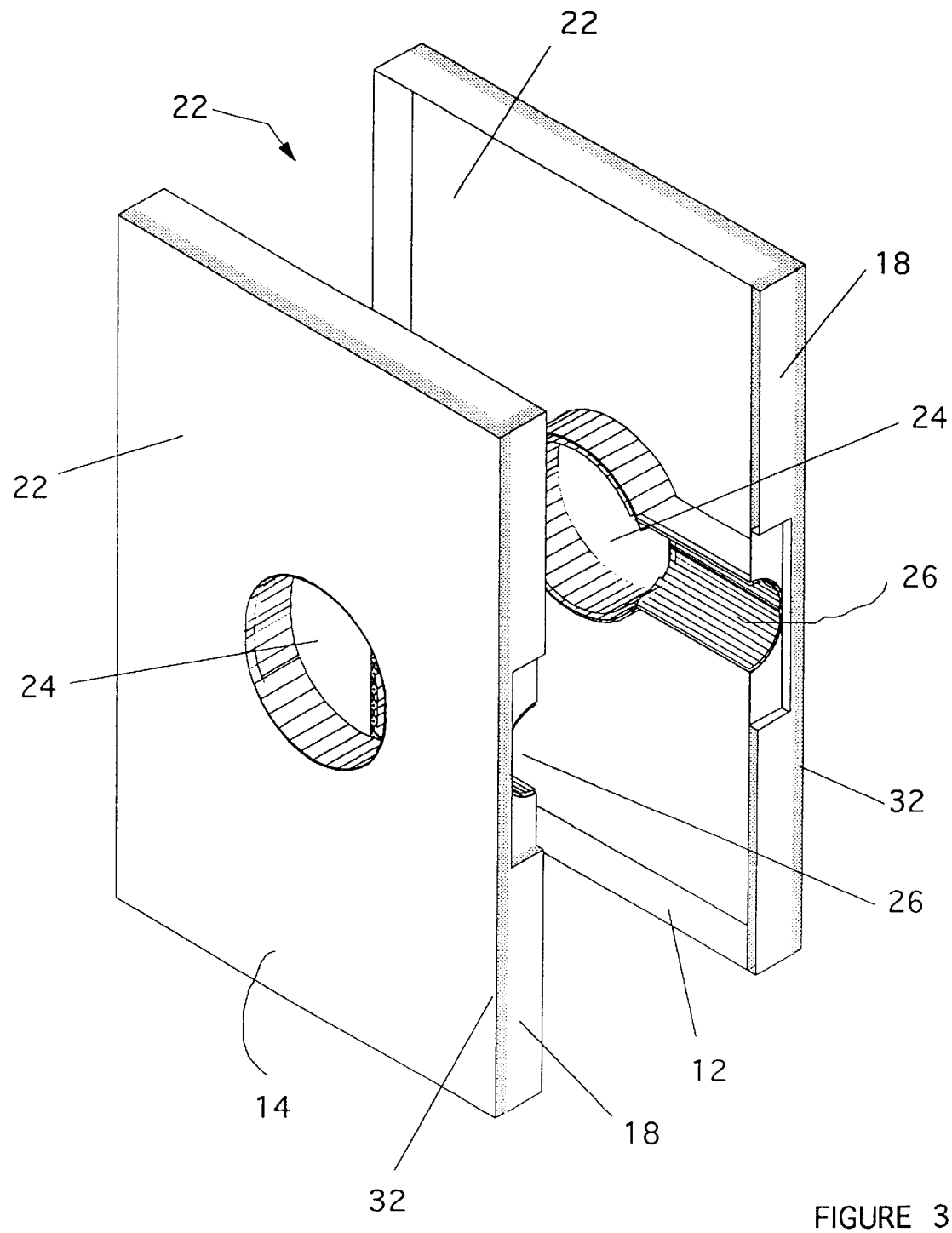
FIG. 3 is an detailed exploded perspective view of a lock latch area of the door illustrated in FIG. 1.
Figure 4:
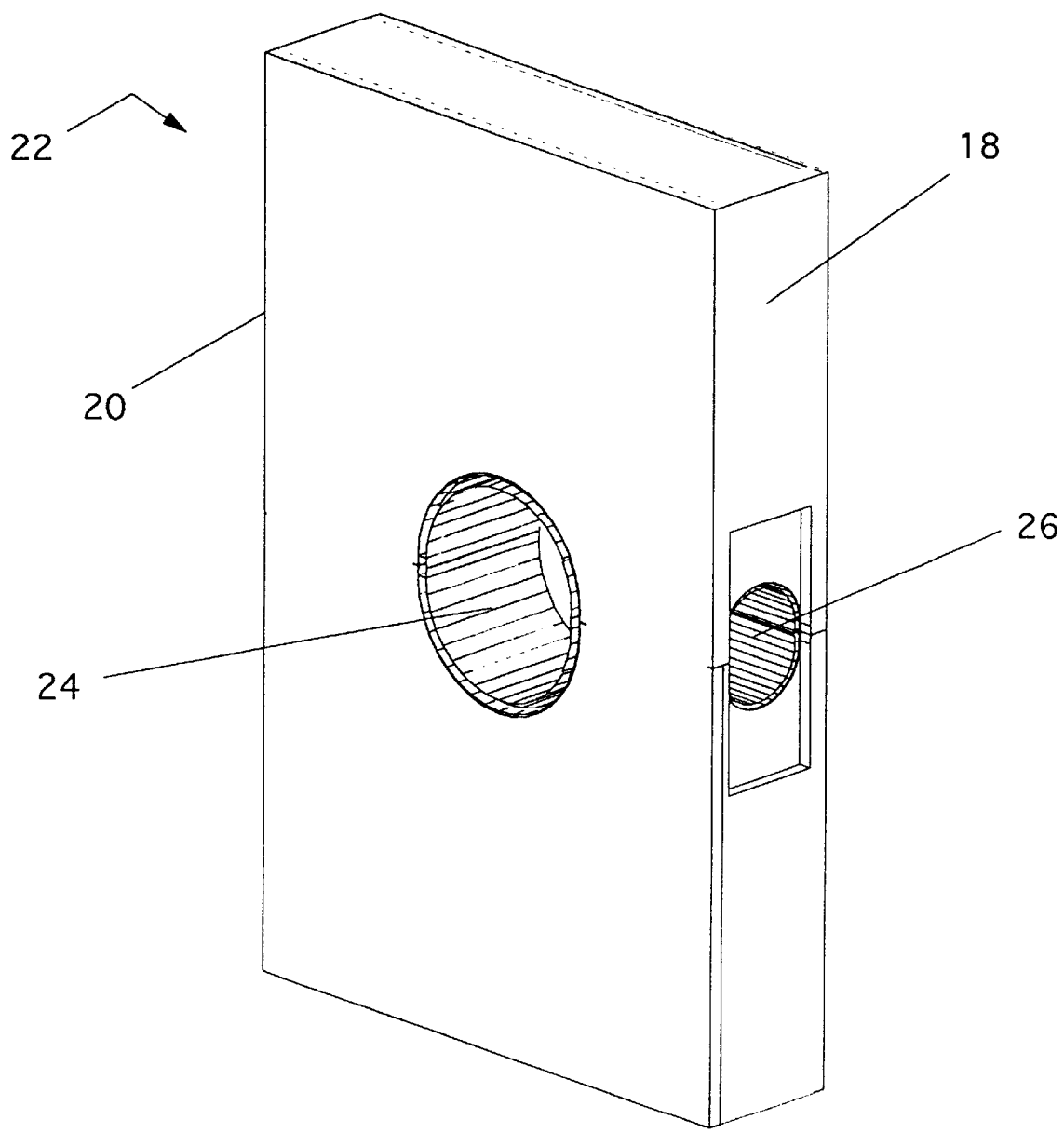
FIG. 4 is a detailed perspective view of lock latch detail for the door illustrated in FIG. 1.
Figure 6:
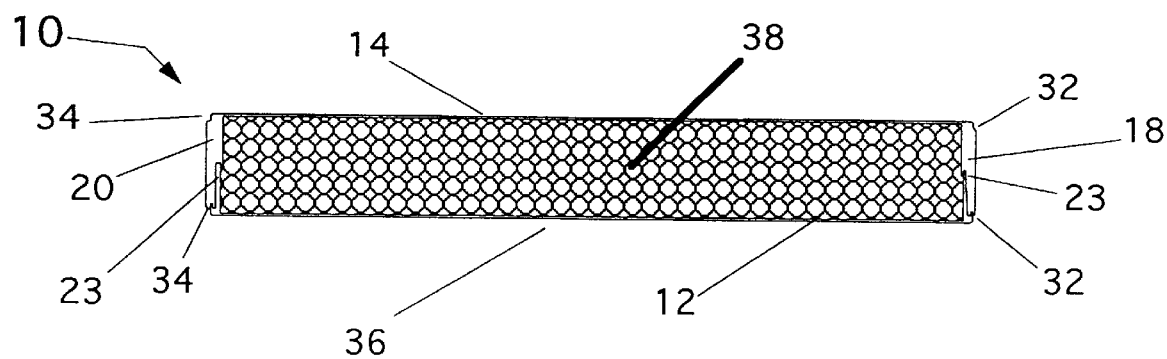
FIG. 6 is a top plan view, in section, of the door illustrated in FIG. 1.

Referring to FIG. 2, the preferred method of fabricating door 10 includes a first step of molding a first door skin 12 and a second step of molding a second door skin 14. At least one of first door skin 12 and second door skin 14 has a pair of molded in place rails 16. In the illustrated embodiment both first door skin 12 and second door skin 14 has molded in place rails 16. At least one of first door skin 12 and second door skin 14 has molded in place stiles 18 and 20. In the illustrated embodiment both first door skin 12 and second door skin 14 has molded in place stiles 18 and 20. Referring to FIG. 3, at least one of first door skin 12 and second door skin 14 has a molded in place lock latch area 22 adjoining first stile 18. In the illustrated embodiment both first door skin 12 and second door skin 14 have molded in placed lock latch areas 22. Each half of lock latch area 22 has a molded lock chamber 24 and one half of a molded lock bolt bore 26. A third step is integrally bonding first door skin 12 and second door skin 14 at a matching interface 23 of first door skin 12 and second door skin 14, as illustrated in FIG. 6. This produces door 10 which has integral skins 12 and 14, rails 16, first stile 18, second stile 20, and lock latch area 22 as illustrated in FIG. 1. Referring to FIG. 4, when first door skin 12 and second door skin 14 are bonded to form an integrated body the two halves of lock latch area 22 are integrated to form lock latch area 22, thereby integrating the two halves of lock chamber 24 and the two halves of lock bolt bore 26.

Figure 5:
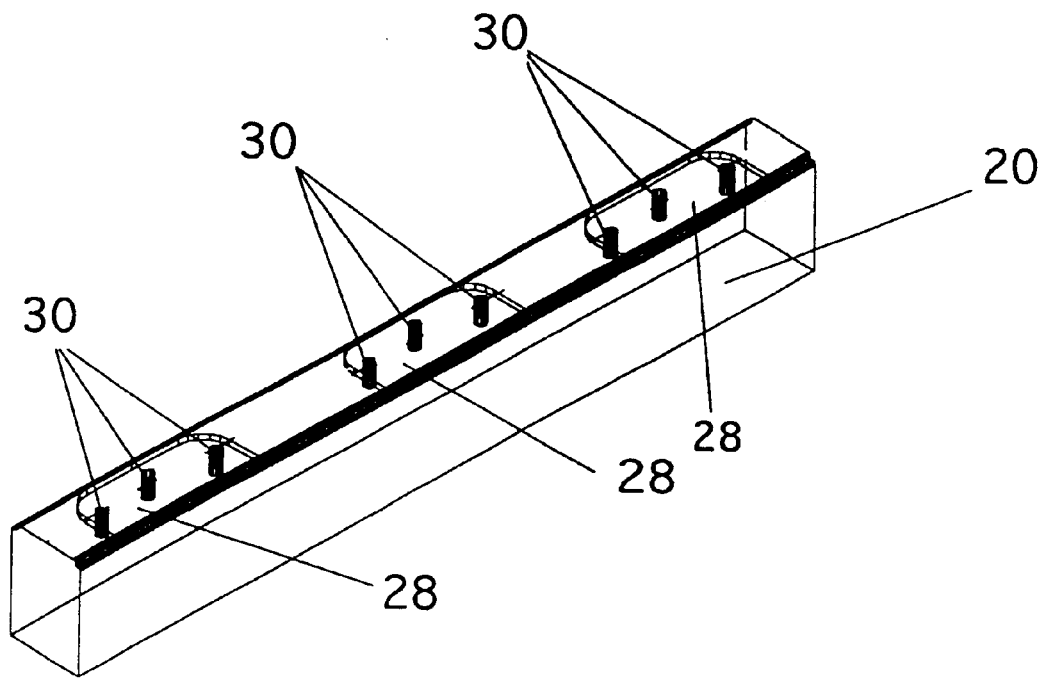
FIG. 5 is a detailed perspective view of hinge pocket detail for the door illustrated in FIG. 1.

Referring to FIG. 2, each of first door skin 12 and second door skin 14 each have second stile 20. Referring to FIG. 6, second stile 20 of first door skin 12 overlaps second stile 20 of second door skin 14. Second stile 20 of first door skin 12 has molded in place hinge pockets 28. Referring to FIG. 5, upon integrally bonding first door skin 12 and second door skin 14 a door blank so formed has integral hinge pockets 28. For purposes of illustration three hinge pockets are shown as integral components of second stile 20. Referring to FIG. 5, Second stile 20 of first door skin 12 has molded in place screw receiving apertures 30 positioned within hinge pockets 28. Referring to FIG. 2, second stile 20 of second door skin 14 also has integrally formed screw receiving apertures 30 which facilitates penetration of screws into second door skin 14. Referring to FIG. 5, when first door skin 12 and second door skin 14 are integrally bonded together screw receiving apertures 30 on first door skin 12 and second door skin 14 are positioned in register. For purposes of illustration three screw apertures 30 are shown in each hinge pocket 28. Referring to FIG. 6, each first stile 18 and second stile 20 has molded in place bevelled edge 32 and 34, respectively. Referring to FIG. 6, body of door 10 fabricated according to the described method has a cavity 36 into which is injected insulating foam 38.

Referring to FIG. 2, door 10 fabricated by following the teachings of the above described method comprises a body of moldable material having first integrally molded skin 12, second integrally molded skin 14, rails 16, first stile 18 and second stile 20. Referring to FIG. 4, door 10 also has an integrally molded lock latch area 22 with lock chamber 24 and lock bolt bore 26. Referring to FIG. 5, second stile 20 of door 10 has integral hinge pockets 28 each having integrally formed screw receiving apertures 30. Referring to FIG. 6, door 10 has integrally molded bevelled edges 32 and 34 and foam core 38.

Door 10 fabricated according to the above teachings has advantages including that it is hermetically sealed, is prefinished and is ready for hanging. It will not "delaminate". The mode of fabrication, as described, will produce a door that will be less subject to warpage. The door produced is prefinished. It can be molded to any size, design and colour desired. Once molded in a selected colour, scratches will be less visible as the material is the same colour throughout. A scratch merely reveals underlying material of the same colour.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A method of fabricating a door, comprising the steps of:
    molding a first door skin;
    molding a second door skin;
    at least one of the first door skin and the second door skin having molded in place rails;
    at least one of the first door skin and the second door skin having molded in place stiles; and
    integrally bonding the first door skin and the second door skin, thereby producing a door blank having integral skins, rails, and stiles, wherein at least one of the first door skin and the second door skin having a molded in place latch area with a molded lock chamber and a molded lock bolt bore, such that upon integrally bonding the first door skin and the second door skin the door blank has an integral latch area.

2. The method as defined in claim 1, at least one of the first door skin and the second door skin having a molded in place hinge pocket, such that upon integrally bonding the first door skin and the second door skin the door blank has integral hinge pockets.

3. The method as defined in claim 2, having integrally formed screw receiving apertures positioned in the hinge pockets.

4. The method as defined in claim 1, the first door skin and the second door skin having molded in place bevelled edges.

5. The method as defined in claim 1, the body having a cavity into which is injected insulating foam.

* * * * *